US008751467B2

(12) United States Patent
Lee (10) Patent No.: US 8,751,467 B2
(45) Date of Patent: Jun. 10, 2014

(54) METHOD AND APPARATUS FOR QUICKLY ACCESSING BACKING STORE METADATA

(75) Inventor: Kent Lee, Ladera Ranch, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 1347 days.

(21) Appl. No.: 11/624,524

(22) Filed: Jan. 18, 2007

(65) Prior Publication Data

US 2008/0177954 A1 Jul. 24, 2008

(51) Int. Cl.
*G06F 17/30* (2006.01)

(52) U.S. Cl.
USPC .......................................... 707/704; 707/783

(58) Field of Classification Search
None
See application file for complete search history.

(56) References Cited

U.S. PATENT DOCUMENTS

| | | | |
|---|---|---|---|
| 5,551,046 A * | 8/1996 | Mohan et al. ................. | 707/8 |
| 5,778,189 A | 7/1998 | Kimura et al. | |
| 5,812,843 A | 9/1998 | Yamazaki et al. | |
| 5,963,962 A | 10/1999 | Hitz et al. | |
| 6,073,209 A | 6/2000 | Bergsten et al. | |
| 6,076,148 A | 6/2000 | Kedem | |
| 6,289,356 B1 | 9/2001 | Hitz et al. | |
| 6,292,808 B1 * | 9/2001 | Obermarck et al. ............ | 707/202 |
| 6,341,341 B1 | 1/2002 | Grummon et al. | |
| 6,548,634 B1 | 4/2003 | Balinger et al. | |
| 6,557,079 B1 | 4/2003 | Mason, Jr. et al. | |
| 6,594,744 B1 | 7/2003 | Humlicek et al. | |
| 6,615,223 B1 | 9/2003 | Shih et al. | |
| 6,711,409 B1 | 3/2004 | Zavgren et al. | |
| 6,771,843 B1 | 8/2004 | Huber et al. | |
| 6,792,518 B2 | 9/2004 | Armangau et al. | |
| 6,907,512 B2 | 6/2005 | Hill et al. | |
| 7,047,380 B2 | 5/2006 | Tormasov et al. | |
| 7,050,457 B2 | 5/2006 | Erfurt et al. | |
| 7,100,089 B1 | 8/2006 | Phelps | |
| 7,165,156 B1 | 1/2007 | Cameron et al. | |
| 7,191,304 B1 | 3/2007 | Cameron et al. | |
| 7,194,550 B1 | 3/2007 | Chamdani et al. | |

(Continued)

FOREIGN PATENT DOCUMENTS

| | | |
|---|---|---|
| CA | 2165912 | 6/1997 |
| EP | 1003103 | 5/2000 |

(Continued)

OTHER PUBLICATIONS

Written Opinion from the PCT dated Mar. 27, 2007 with regard to corresponding PCT Application No. PCT/US/06/32506, 10 pages.
International Search Report from the PCT dated Mar. 27, 2007 with regard to corresponding PCT Application No. PCT/US/06/32506, 3 pages.

(Continued)

*Primary Examiner* — Christyann Pulliam
*Assistant Examiner* — Charles Adams
(74) *Attorney, Agent, or Firm* — Thomas J. Lavan; Matthew R. Ellsworth (57) ABSTRACT

A method, device, and system are provided for accessing metadata in a data storage system. More specifically, a requesting application requests a cache application to allocate a cache page to retrieve metadata from a storage device. After metadata is written to the cache page, the cache page is locked by the requesting application. The cache page is maintained in a locked state by the requesting application. This allows the data stored within the cache page to be quickly accessed and updated by the requesting application without waiting for the cache page to be written back to the storage device after every update to the cache page occurs.

19 Claims, 4 Drawing Sheets

(56) References Cited

U.S. PATENT DOCUMENTS

| | | | |
|---|---|---|---|
| 7,206,961 | B1 | 4/2007 | Mutalik et al. |
| 7,243,157 | B2 | 7/2007 | Levin et al. |
| 7,313,581 | B1 | 12/2007 | Bachmann et al. |
| 7,363,444 | B2 | 4/2008 | Ji et al. |
| 7,373,366 | B1 | 5/2008 | Chatterjee et al. |
| 7,526,640 | B2 | 4/2009 | Bazan Bejarano |
| 2001/0039629 | A1 | 11/2001 | Feague et al. |
| 2002/0083037 | A1 | 6/2002 | Lewis et al. |
| 2002/0091670 | A1 | 7/2002 | Hitz et al. |
| 2002/0099907 | A1 | 7/2002 | Castelli et al. |
| 2002/0112084 | A1 | 8/2002 | Deen et al. |
| 2003/0154314 | A1 | 8/2003 | Mason et al. |
| 2003/0158863 | A1 | 8/2003 | Haskin et al. |
| 2003/0167380 | A1 | 9/2003 | Green et al. |
| 2003/0188223 | A1 | 10/2003 | Alexis et al. |
| 2003/0191745 | A1* | 10/2003 | Jiang et al. ............ 707/2 |
| 2003/0229764 | A1 | 12/2003 | Ohno et al. |
| 2004/0030727 | A1 | 2/2004 | Armangau |
| 2004/0030846 | A1 | 2/2004 | Armangau et al. |
| 2004/0030951 | A1 | 2/2004 | Armangau |
| 2004/0034647 | A1 | 2/2004 | Paxton et al. |
| 2004/0054131 | A1 | 3/2004 | Balinger et al. |
| 2004/0093555 | A1 | 5/2004 | Therrien et al. |
| 2004/0117567 | A1 | 6/2004 | Lee et al. |
| 2004/0133718 | A1 | 7/2004 | Kodama et al. |
| 2004/0172509 | A1 | 9/2004 | Takeda et al. |
| 2004/0204071 | A1 | 10/2004 | Bahl et al. |
| 2004/0260673 | A1 | 12/2004 | Hitz et al. |
| 2004/0267836 | A1 | 12/2004 | Armangau et al. |
| 2005/0004979 | A1 | 1/2005 | Berkowitz et al. |
| 2005/0044088 | A1 | 2/2005 | Lindsay et al. |
| 2005/0065985 | A1 | 3/2005 | Tummala et al. |
| 2005/0066095 | A1 | 3/2005 | Mullick et al. |
| 2005/0066128 | A1 | 3/2005 | Yagisawa et al. |
| 2005/0071393 | A1 | 3/2005 | Ohno et al. |
| 2005/0122791 | A1* | 6/2005 | Hajeck ............ 365/189.11 |
| 2005/0166022 | A1 | 7/2005 | Watanabe |
| 2005/0182910 | A1 | 8/2005 | Stager et al. |
| 2005/0193180 | A1 | 9/2005 | Fujibayashi et al. |
| 2005/0198452 | A1 | 9/2005 | Watanabe |
| 2005/0240635 | A1 | 10/2005 | Kapoor et al. |
| 2005/0246397 | A1 | 11/2005 | Edwards et al. |
| 2005/0246503 | A1 | 11/2005 | Fair |
| 2006/0020762 | A1 | 1/2006 | Urmston |
| 2006/0053139 | A1 | 3/2006 | Marzinski et al. |
| 2006/0064541 | A1 | 3/2006 | Kano et al. |
| 2006/0107006 | A1 | 5/2006 | Green et al. |
| 2006/0155946 | A1 | 7/2006 | Ji et al. |
| 2006/0212481 | A1 | 9/2006 | Stacey et al. |
| 2006/0271604 | A1 | 11/2006 | Schoens et al. |
| 2007/0011137 | A1 | 1/2007 | Kodama |
| 2007/0038703 | A1 | 2/2007 | Tendjoukian et al. |
| 2007/0055710 | A1 | 3/2007 | Malkin et al. |
| 2007/0094466 | A1 | 4/2007 | Sharma et al. |
| 2007/0100808 | A1 | 5/2007 | Balogh |
| 2007/0143563 | A1 | 6/2007 | Pudipeddi et al. |
| 2007/0198605 | A1 | 8/2007 | Saika |
| 2007/0266066 | A1 | 11/2007 | Kapoor et al. |
| 2007/0276885 | A1 | 11/2007 | Valiyaparambil et al. |
| 2008/0082593 | A1 | 4/2008 | Komarov et al. |

FOREIGN PATENT DOCUMENTS

| | | |
|---|---|---|
| WO | WO9429807 | 12/1994 |
| WO | WO 0250716 | 6/2002 |
| WO | WO2005111773 | 11/2005 |
| WO | WO2005111802 | 11/2005 |

OTHER PUBLICATIONS

International Preliminary Report on Patentability and Written Opinion from the PCT dated Mar. 20, 2008 with regard to corresponding PCT Application No. PCT/US/06/32506, 10 pages.
Notice of Allowance in U.S. Appl. No. 11/277,738, Mar. 20, 2008, 6 pages.
Office Action in U.S. Appl. No. 11/277,738, Dec. 6, 2007, 9 pages.
Office Action in U.S. Appl. No. 11/277,738, Jul. 31, 2007, 8 pages.
Office Action in U.S. Appl. No. 11/277,738, Apr. 3, 2007, 14 pages.
International Search Report from the PCT dated Aug. 7, 2008 with regard to corresponding PCT Application No. PCT/US/08/57326, 2 pages.
Written Opinion from the PCT dated Aug. 7, 2008 with regard to corresponding PCT Application No. PCT/US/08/57326, 6 pages.
Analysis from foreign associate dated Oct. 22, 2009 from 1st office action from Chinese patent office for application 200680032724.8.
Office Action in U.S. Appl. No. 11/561,512, Oct. 30, 2009, 9 pages.
Official Action for U.S. Appl. No. 11/747,109, mailed Sep. 21, 2009.
Official Action for U.S. Appl. No. 11/747,127, mailed Oct. 6, 2009.
Official Action for U.S. Appl. No. 11/734,081, mailed Aug. 21, 2009.
Office Action in U.S. Appl. No. 11/779,965, Jan. 29, 2010.
Office Action in U.S. Appl. No. 11/561,512, Mar. 18, 2010.
Official Action for U.S. Appl. No. 11/747,109, mailed Mar. 30, 2010.
Official Action for U.S. Appl. No. 11/945,940, mailed Mar. 5, 2010.
Notice of Allowance for U.S. Appl. No. 11/734,081, mailed Feb. 2, 2010.
Notice of Allowance for U.S. Appl. No. 11/734,081, mailed Mar. 10, 2010.
Office Action in U.S. Appl. No. 11/561,512, Dec. 10, 2009.
Official Action for U.S. Appl. No. 11/747,109, mailed Dec. 14, 2009.
Official Action for U.S. Appl. No. 11/747,127, mailed Jan. 6, 2010.
Official Action for U.S. Appl. No. 11/624,565, mailed Nov. 30, 2009.
Notice of Allowance for U.S. Appl. No. 11/747,127, mailed May 14, 2010.
Notice of Allowance for U.S. Appl. No. 11/747,127, mailed Jun. 2, 2010.
Notice of Allowance for U.S. Appl. No. 11/747,127, mailed Jun. 15, 2010.
Official Action for U.S. Appl. No. 11/768,127, mailed Apr. 2, 2010.
Official Action for U.S. Appl. No. 11/768,127, mailed Jun. 1, 2010.
Notice of Allowance for U.S. Appl. No. 11/945,940, mailed Jun. 18, 2010.
Office Action in U.S. Appl. No. 11/779,965, Jun. 24, 2010.
Examiner's answer in U.S. Appl. No. 11/561,512, Sep. 2, 2010.
Notice of Allowance for U.S. Appl. No. 11/945,940, mailed Jul. 13, 2010.
Notice of Allowance for U.S. Appl. No. 11/747,127, mailed Jul. 13, 2010.
Notice of Allowance for U.S. Appl. No. 11/624,565, mailed Sep. 14, 2010.
Official Action for U.S. Appl. No. 12/780,891, mailed Sep. 20, 2010.
Official Action for U.S. Appl. No. 12/540,243, mailed Dec. 17, 2012.
Official Action for U.S. Appl. No. 12/540,243, mailed Jul. 19, 2013.
Notice of Allowance for U.S. Appl. No. 11/747,109, mailed Jul. 11, 2011.
Official Action for U.S. Appl. No. 12/780,891, mailed Sep. 29, 2011.
Notice of allowance for U.S. Appl. No. 11/768,127, mailed Apr. 18, 2012.
Notice of Allowance for U.S. Appl. No. 12/780,891, mailed Apr. 26, 2012.
Official Action for U.S. Appl. No. 11/768,127, mailed Dec. 28, 2011.
Official Action for U.S. Appl. No. 12/540,243, mailed Feb. 2, 2012.
Official Action for U.S. Appl. No. 12/540,243, mailed Sep. 6, 2012.
Office Action in U.S. Appl. No. 11/561,680, Nov. 5, 2010.
Notice of Allowance for U.S. Appl. No. 11/624,565, mailed Sep. 29, 2010.
Official Action for U.S. Appl. No. 11/768,127, mailed Nov. 3, 2010.
Office Action in U.S. Appl. No. 11/561,680, Apr. 15, 2011.
Notice of Allowance for U.S. Appl. No. 11/779,965, mailed May 16, 2011.
Notice of Allowance for U.S. Appl. No. 11/779,965, mailed May 27, 2011.
Official Action for U.S. Appl. No. 11/747,109, mailed Mar. 18, 2011.
Notice of Allowance for U.S. Appl. No. 11/747,109, mailed Apr. 29, 2011.
Official Action for U.S. Appl. No. 12/780,891, mailed Mar. 25, 2011.

* cited by examiner

METHOD AND APPARATUS FOR QUICKLY ACCESSING BACKING STORE METADATA

FIELD

The present invention is directed to data storage management. In particular, the present invention is directed to methods and apparatuses for quickly accessing metadata in a storage system.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often advantageous to maintain different versions of a data storage volume. Indeed, data storage systems are available that can provide at least limited data archiving through backup facilities and/or snapshot facilities. The use of snapshot facilities greatly reduces the amount of storage space required for archiving large amounts of data. However, accessing the snapshot data has become somewhat inefficient through the development of snapshot facilities.

Traditionally, when an application on a controller wanted to access snapshot data the application would first need to retrieve the snapshot metadata from a storage device. The metadata provides addresses or pointers to actual snapshot data stored in a backing store. There are currently a number of ways that an application can gain access to such metadata. In one approach, the application issues a request to read metadata to a cache. A cache is a temporary storage area where frequently accessed data can be stored for rapid access. Upon receiving the read request, the cache reads the metadata from a storage device into its cache pages. After the metadata is read into the cache pages, the metadata is copied to an application cache buffer. Application cache buffers are a temporary storage location where blocks of data are assembled or disassembled for the application. When the metadata is assembled in the application cache buffer, the application is allowed to access the metadata. Through the course of accessing the metadata, the application may change the metadata, which would result in a change to the buffer. When the application is finished changing the buffer, the application commits the changes to the cache. The "commit" operation in this case copies the updated application cache buffer to the cache pages before mirroring the cache pages to a remote system (e.g., a redundant controller) and allowing the cache pages to be written back to a storage device. This approach of accessing metadata is inefficient since it involves multiple steps of copying cache pages.

In another metadata access approach, the application issues a request to read metadata to the cache. The cache reads the metadata from the appropriate storage device to its cache pages, locks the cache pages, and returns the internal cache page address to the application. The application can then use the cache page address to access the metadata, which is still stored in the cache page. The application can also update the metadata in this approach. After the application finishes its update, the application issues a command to the cache requesting that it commit the changes. The "commit" operation in this case causes the cache to mirror its cache pages to the remote system. Then the cache pages are written back to the appropriate storage device after they have been mirrored. This particular approach resolves the issues associated with copying cache pages to an application cache buffer. However, the downside to this approach is that the application must request and obtain the cache pages every time the application needs to update the metadata. Also, during the commit, no application will be allowed access to the cache pages, which could impact performance by serializing the applications trying to access different areas of the same cache page. In other words, the cache maintains control over the cache pages and whenever a commit operation is executed, an application has to wait for the completion of the commit operation before it can access the cache pages to execute a read and/or write command. This can delay certain Input/Output (I/O) requests received by the application because every commit operation includes a mirroring metadata step and a writing metadata back to the storage device step. If the application were allowed to access the metadata under the cache's control while the cache is committing it, there is a possibility that data corruption (e.g., data may be out of sync between the mirrored metadata and the metadata stored on the storage device) could occur.

SUMMARY

The present invention is directed to solving these and other problems and disadvantages of the prior art. In accordance with embodiments of the present invention, a service for efficiently accessing metadata is provided. In one embodiment, a method of accessing metadata is provided. The method generally includes the steps of an application requesting that a cache application retrieve metadata from a storage device. Upon receiving the request, the cache application retrieves the requested metadata and writes the metadata to one or more cache pages. The application then assumes control of at least one cache page having metadata and locks the cache page. With the cache page locked, the application is free to access the metadata at its convenience. The locking of the cache page prevents the cache from reallocating the cache page for another purpose. Additionally, when the cache page is locked, the cache application is prevented from writing the contents of the cache back to a storage device. In one embodiment, the locking of the cache page does not limit the ability of other applications to access the metadata on the cache page, but does restrict the cache application's control of the cache page. Additionally, when changes to the metadata are committed, the application can continue to access other areas of metadata contained on the cache page since the application has control of the cache page.

In another embodiment, a device for controlling a storage system is provided. The device generally comprises a first application and a cache memory comprising a cache page. The first application receives and executes a command from a host. The command may require that the first application utilize metadata stored on a storage device. To execute commands that require access to metadata, the application may include a locking function operable to request that the cache memory allocate the cache page to store the metadata. The locking function may also be operable to assume control over the cache page and lock the cache page after the metadata has been written to the cache page. Then, the first application may employ a metadata reader/writer to access the metadata while it is locked by the locking function. The utilization of a locking function allows the first application to maintain control over the cache page for as long as it needs access to the metadata. In one embodiment, the cache page is maintained in a locked state by the locking function until a shutdown event occurs. In the absence of a shutdown event, the first application can continue to quickly access the metadata from the cache page because the cache page is maintained locally at the device.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a storage volume. The data is essentially frozen in time at the instant that the snapshot is taken. Although data on the storage volume may change as a result of write operations, the data represented by the snapshot will remain constant and frozen in time at the instant that the snapshot was taken. In order to preserve snapshot data, a repository (e.g., a backing store) is used to store data that is not otherwise represented in the storage volume. Additionally, the backing store is used to store metadata for the master and snapshot volume. All data and metadata associated with the snapshot is typically stored in the backing store, although such storage on the backing store is not required. In accordance with embodiments of the present invention, data stored within the snapshot is stored in "chunks." A chunk is equivalent to a number of logical data blocks (LBAs). As a further optimization, data may also be stored at a subchunk level. A subchunk is a fixed size subset of a chunk. The snapshot metadata provides information related to the storage location and state of the snapshot data in the backing store.

Figure 1:
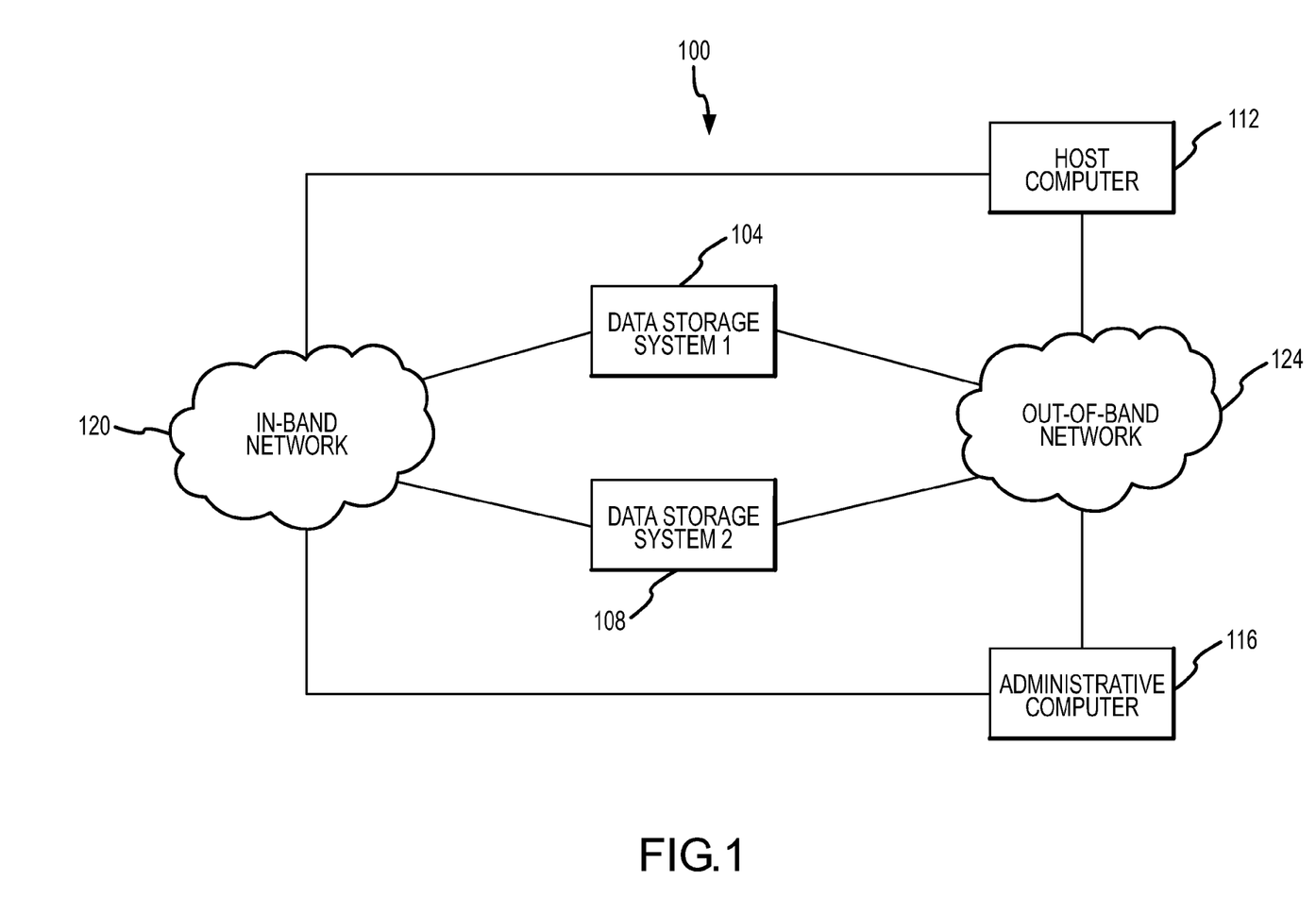
FIG. 1 is a functional block diagram depicting components of an electronic data system incorporating one or more data storage systems in accordance with embodiments of the present invention.

FIG. 1 is a block diagram depicting an electronic data system 100 in accordance with embodiments of the present invention incorporating a first data storage system 104. As illustrated, the system 100 may, but need not, also include a second data storage system 108. The electronic data system 100 may also include one or more host processors, computers, or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, Infiniband, SAS, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrator computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although two data storage systems 104, 108 are shown in FIG. 1, an electronic data system 100 may include more than two data storage systems or may include a single data storage system.

Figure 2:
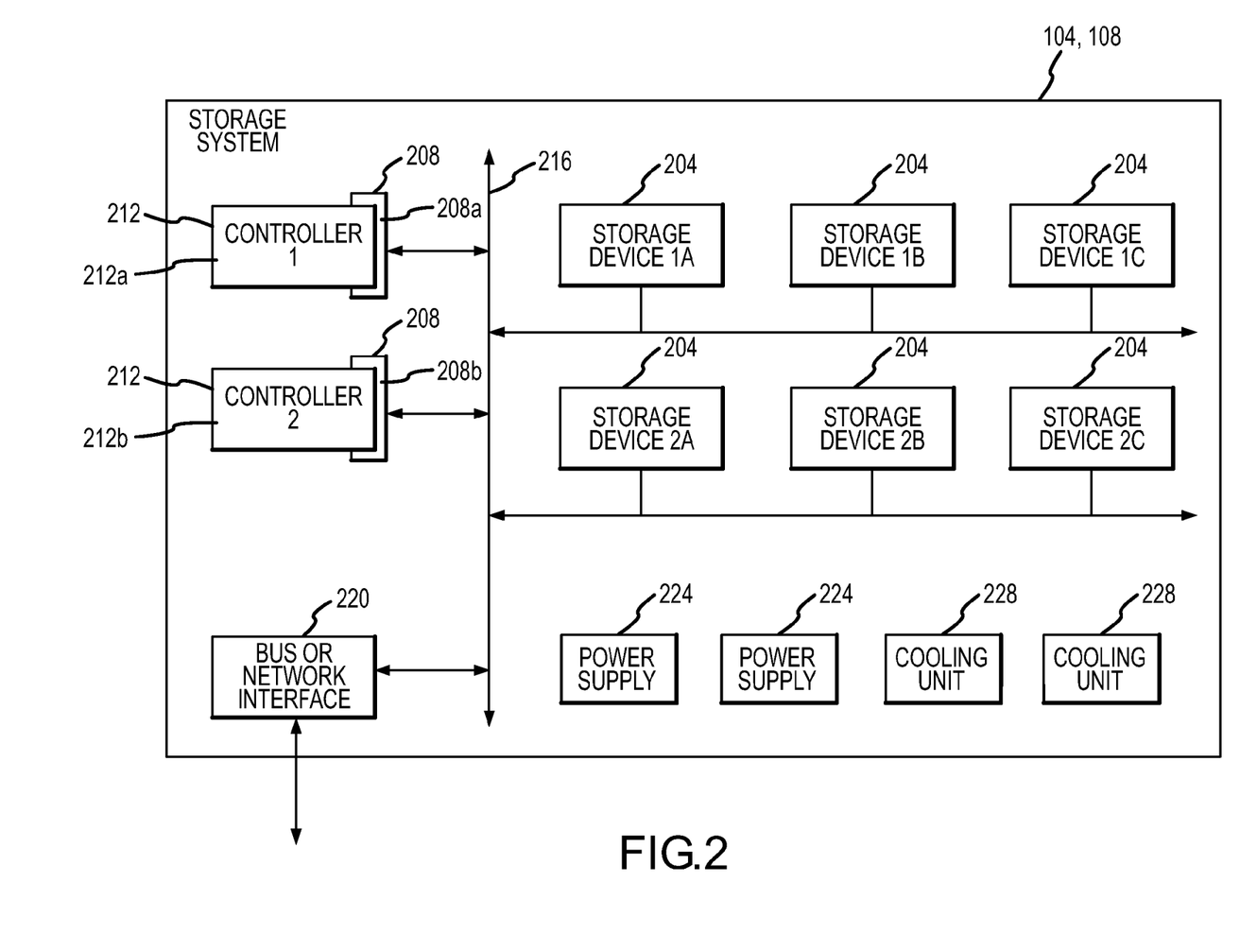
FIG. 2 is a block diagram depicting components of a data storage system in accordance with embodiments of the present invention.

FIG. 2 illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid-state disk devices. Furthermore, although a number of storage devices 204 are illustrated, it should be appreciated that embodiments of the present invention are not limited to any particular number of storage devices 204, and that a lesser or greater number of storage devices 204 may be provided as part of a data storage system 104. As can be appreciated by one of skill in the art, one or more arrays arid/or array partitions, hereinafter referred to as Logical Unit Numbers (LUNs) comprising a storage volume, may be established on the data storage devices 204. As can be further appreciated by one of skill in the art, a LUN may be implemented in accordance with any one of the various RAID levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. As can also be appreciated by one of skill in the art, the storage devices 204 contain data comprising a master storage volume, which may correspond to a LUN, and one or more snapshots of the storage volume taken at different times. In one embodiment, the snapshots may be mapped to the LUNs and stored on a backing store. However, the backing store, which also occupies an array and/or array partition, does not have a LUN number assigned to it, thus making the backing store invisible to a host computer 112 and/or administrative computer 116.

A data storage system 104, 108 in accordance with embodiments of the present invention may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-.failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller 212b. As can be appreciated by one of skill in the art, the provision of two controllers, 212a to 212b, permits data to be mirrored between the controllers 212a-212b, providing redundant active-active controller operation. One or both of the controllers constitute a means for controlling.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104, 108 include one or more power supplies 224 and one or more cooling units 228. In addition, a bus or network interface 220 may be provided to interconnect the data storage system 104, 108 to the bus or network 112, and/or to a host computer 108 or administrative computer 116.

Although illustrated as a complete RAID system in FIG. 2, it should be appreciated that the data storage system 104, 108 can comprise one or more storage volumes implemented in various other ways. For example, the data storage system 104, 108 may comprise a hard disk drive or other storage device 204 connected or associated with a server or a general-purpose computer. As further examples, the storage system 104 may comprise a Just a Bunch of Disks (JBOD) system or a Switched Bunch of Disks (SBOD) system.

Figure 3:
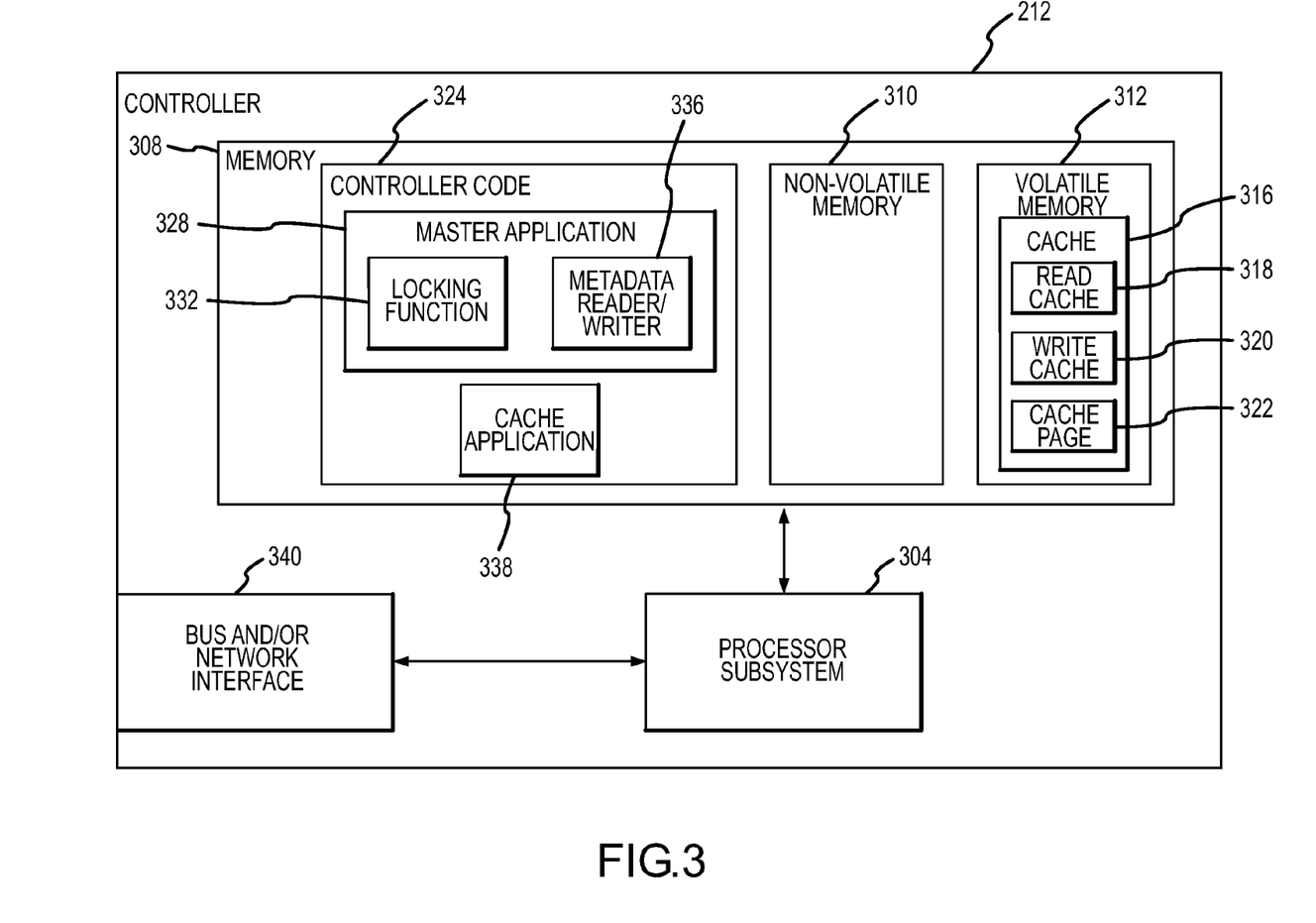
FIG. 3 is a block diagram depicting components of a storage controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for taking and accessing snapshots. In addition, such instructions may include instructions for implementing aspects of a metadata access method and apparatus. Furthermore, such instructions may be stored as software and/or firmware. As can be appreciated by one of skill in the art, operations concerning the generation of parity data or other operations may be performed using one or more hardwired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (CPLD).

A controller 212 also generally includes memory 308. The memory 308 is not specifically limited to memory of any particular type. For example, the memory 308 may comprise a solid-state memory device or a number of solid-state memory devices. In addition, the memory 308 may include separate non-volatile memory 310 and volatile memory 312 portions. As can be appreciated by one of skill in the art, the memory 308 may include a read cache 318 and a write cache 320 that are provided as part of the volatile memory 312 portion of the memory 308, although other arrangements are possible. For example, a cache 316 may be provided as a part of the volatile memory 312 but may have provisions in place to maintain the memory if a power failure occurs. The cache 316 may be supported by an emergency battery, capacitor, super capacitor, or the like, thereby making the cache 316 operate in a similar fashion to non-volatile memory 310 even though it is provided as a part of the volatile memory 312. By providing read 318 and write caches 320, a storage controller 212 can improve the speed of I/O operations between a host 108 and the data storage devices 204 comprising an array or array partition. In accordance with one embodiment of the invention, a cache 316 further comprises one or more cache pages 322. As illustrated, a cache page 322 may be a separate dedicated portion of the cache 316 used to retrieve metadata from a storage device 204. Alternatively, portions of the read 318 and/or write cache 320 may be used as a cache page to retrieve metadata from a storage device 204. Examples of volatile memory 312 include DRAM and SDRAM.

The non-volatile memory 310 may be used to store data that was written to the write cache 320 in the event of a power outage affecting the data storage system 104. The non-volatile memory portion 310 of the storage controller memory 308 may include any type of data memory device that is capable of retaining data without requiring power from an external source. Examples of non-volatile memory 310 include, but are not limited to, compact flash or other standardized non-volatile memory devices.

The memory 308 also includes portions of the memory 308 comprising a region that provides storage for controller code 324. The controller code 324 may comprise a number of components, including a master application 328 comprising instructions for executing commands received from a host 112 and/or retrieving and accessing metadata as described herein. A cache application 338 may also be included as a part of the controller code 324. The cache application 338 is used to manipulate the cache 316 and retrieve metadata from the storage device 204. The cache application 338 may be regarded as a means for reading and storing data from a storage device 204 on a cache page 322.

The master application 328 may itself include or be associated with a number of modules or components. Examples of such components that may be included in the master application 328 include, but are not limited to, a locking function 332 and a metadata reader/writer 336. The locking function 332 comprises a means for locking a cache page 322. The locking function 332 is generally used to take control of a cache page 322 after the cache application 338 has stored the metadata retrieved from a storage device 204 in cache page 322. In accordance with embodiments of the present invention, the locking function 332 exists within and is controlled by the master application 328 as depicted in FIG. 3. However, in accordance with other embodiments, the locking function 332 may be provided by the cache application 338 but controlled by the master application 332 to lock the cache page 322.

As a part of controlling the cache page 322, the locking function 332 is able to lock and unlock the cache page 322. When a cache page 322 is locked, the cache application 338 is substantially prohibited from controlling the cache page 322. Functions that the cache application 338 is prohibited from performing include, for example, recycling and/or removing the cache page 322 to store other data. Additionally, the cache application 338 is prohibited from writing the contents of the cache page 322 back to the storage device 204 while the cache page 322 is locked by the locking function 332. Of course, the locking function 332 does not prevent all cache application 338 access/changes to the cache page 322. For example, even when the cache page 322 is locked, the cache application 338 can still move the cache page 322 to a designated area of memory if a storage volume is offline (e.g. a storage device 204 is taken out of service).

The metadata reader/writer 336 is a function employed by the master application 328 to read and/or write metadata to/from the cache page 322. The metadata reader/writer 336 is capable of accessing (i.e., reading and/or writing) metadata on the cache page 322 when the cache page 322 is locked by the locking function 332. In one embodiment, the metadata reader/writer 336 is capable of accessing the metadata on the cache page 322 even when the cache page is being mirrored to a remote system such as from the first controller 212a to the second controller 212b. In other words, the master application 328 does not have to wait for a commit operation to be completed before it can engage the metadata reader/writer 336 to access the cache page 322. Moreover, the master application 328 does not necessarily restrict other applications from accessing the locked cache page 322. For example, the master application 328 may further include sub-applications such as a snapshot delete application, a main I/O statistics update application, a rollback application, and a volume copy application. These sub-applications can access the metadata on a locked cache page 322 simultaneously. The sub-applications do not access the same area of the locked cache page 322 simultaneously. Rather, they have their own areas on the same cache page 322 to which they are allowed access. This is because each sub-application generally requires a different type of metadata from all other sub-applications. Therefore, different types of metadata are dedicated to different sub-applications. It follows that different areas of a cache page 322 are dedicated to the different types of metadata, which means that each sub-application accesses a different area of the cache page 322.

However, external entities such as an application on a different controller 212 are not allowed access to the locked cache page 322. The sub-applications are allowed access to the cache page 322 because the cache page 322 is under the control of the master application 328 via the locking function 332.

A storage controller 212 may additionally include other components. For example, a bus and/or network interface 340 may be provided for operably interconnecting the storage controller 212 to the remainder of the data storage system 104, 108 for example through a controller slot 208 and a bus or channel 216. Furthermore, the interface 340 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
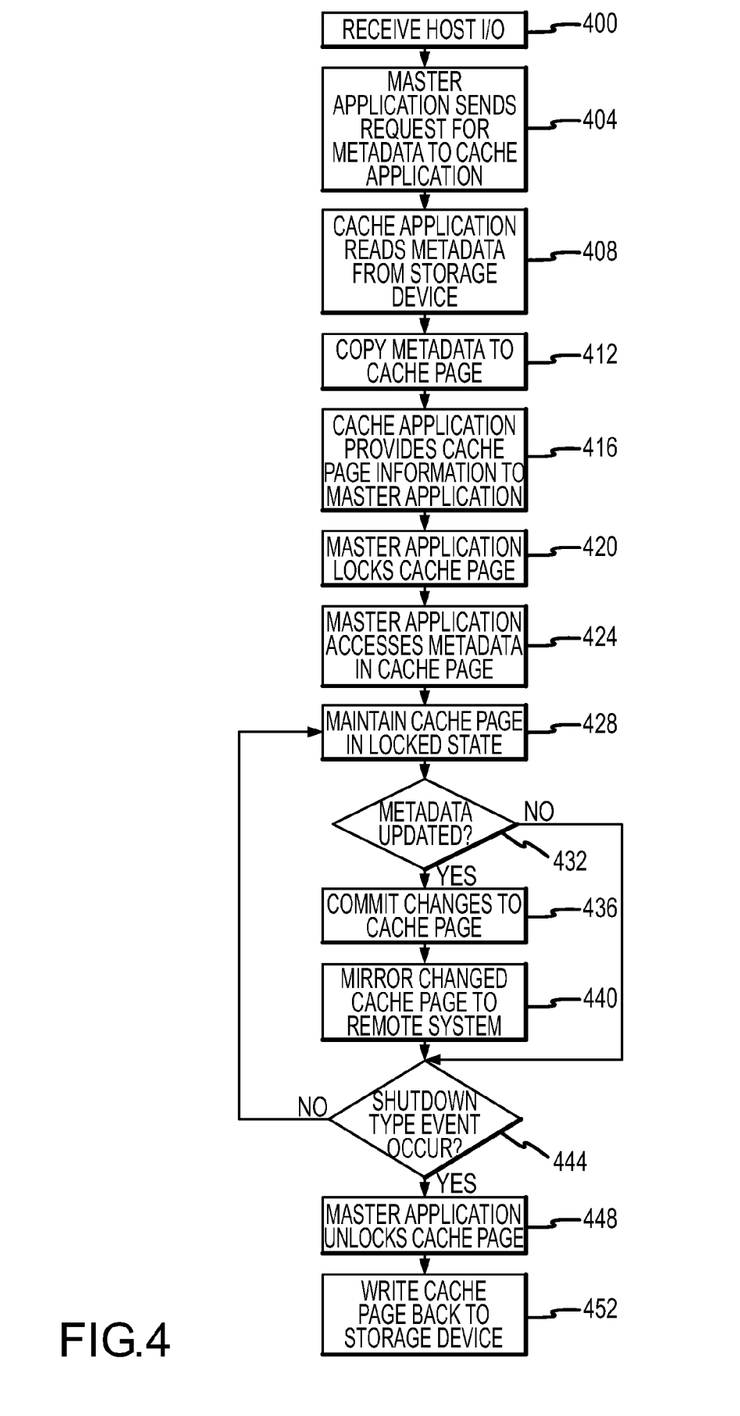
FIG. 4 is a flow chart depicting aspects of a method for accessing metadata in accordance with embodiments of the present invention.

FIG. 4 is a flow diagram depicting a method of accessing metadata from a storage device 204 in accordance with at least some embodiments of the present invention. Initially, the master application 328 receives an I/O command from a host computer 112 and/or administrative computer 116 (step 400). The receipt of an I/O command results in the master application 328 sending a request for metadata to the cache application 338 (step 404). The metadata is requested so that the master application 328 can access the requested data on the storage volume. In one embodiment, the requested data corresponds to snapshot data and therefore the metadata corresponds to snapshot metadata. As noted above, metadata is generally found in the backing store.

Upon receiving the request to retrieve metadata, the cache application 338 allocates a number of cache pages 322 for retrieval of the metadata and reads the metadata from the appropriate storage device 204 (step 408). The read data is then written to one or more of the allocated cache pages 322

(step 412). The cache pages 322 are generally made up of a pool of entries. Each entry has data, which is a copy of the metadata from the backing store. Each entry may also have a tag, which specifies the identity of the metadata in the backing store of which the entry is a copy. The metadata on each cache page 322 provides an address or pointer to the requested data (e.g., snapshot data) and/or any other information related to that data. For example, the metadata may include a flag for the requested data where the flag identifies access permissions and/or restrictions for the associated snapshot data.

When the metadata is written to at least one cache page 322, the cache application 338 provides cache page information to the master application 328 (step 416). In other words, the cache page 322 is maintained in the cache 316, but the master application 328 is given information related to where the cache page 322 is located on the cache 316. This information allows the master application 328 to find and use the metadata stored on the cache page 322. After the master application 328 receives the cache page information, the master application 328 locks the appropriate cache page 322 (i.e., the cache page or pages 322 containing the requested metadata) (step 420). The master application 328 employs the locking function 332 as a part of locking the cache page 322. Locking the cache page 322 prevents the cache application 338 from writing the cache page 322 back to the storage device 204 and/or reallocating the cache page 322 for other uses.

With the cache page 322 locked, the master application 328 is free to access the requested metadata in the cache page 322 (step 424). The master application 328 accesses the metadata in the cache page 322 by utilizing the metadata reader/writer 336. When the metadata reader/writer 336 reads the appropriate metadata, the master application 328 is able to locate the data necessary to execute the I/O command received from the host 112. The command may correspond to a read command for snapshot data. Alternatively, the command may correspond to a write command to write new data to the snapshot. Of course, other commands can be envisioned where the master application 328 requires metadata to locate actual snapshot data. Of course, the use of the metadata is not limited to locating snapshot data. Rather, metadata may also be used in association with the creation of a copy-on-write log or other functions performed by the master application 328.

As noted above, sub-applications under control of the master application 328 may also be allowed to access the locked cache page 322. Examples of such sub-applications include, without limitation, a snapshot delete application, a main I/O statistics update application, a rollback application, and a volume copy application. The sub-applications along with the metadata reader/writer 336 generally constitute a means for accessing and updating metadata.

The master application 328 is allowed continued access to the metadata in the cache page 322 as long as such access is necessary. The cache page 322 is maintained in this locked state while the master application 328 continues to access the metadata on the cache page 322 (step 428). A part of accessing the metadata by the master application 328 may include writing to or updating the metadata. For example, a flag may be updated for certain snapshot data. This type of update would typically require an update of the metadata associated with the snapshot data. Therefore, in step 432, it is determined whether any changes to the metadata have occurred. If an update to the metadata has occurred, then the changes are committed or written to the appropriate cache page 322 (step 436). As a part of the commit operation, just after the cache page 322 has been updated, the changed cache page 322 is mirrored to a remote system (step 440). The mirroring of a cache page 322 helps prevent the irreplaceable loss of metadata in a storage system 104, 108. For instance, the remote system may correspond to a redundant controller 212. Assuming the first controller 212a has control over the cache page 322, the remote system may correspond to the second controller 212b. As can be appreciated, the remote system may be in the same or different storage system 104, 108 as the application 328.

After the changes to the cache page 322 has been mirrored to a remote system or if no change to the metadata has occurred, it is determined whether a shutdown type event has occurred (step 444). A shutdown type event may include any event that disturbs the power supply to the controller 212. Examples of shutdown events include, without limitation, a power outage, shutting down the controller 212, removing the controller 212, rebooting the controller 212, and so on. As can be appreciated by one of skill in the art, a shutdown type event may also correspond to an event where the master application 328 determines that some or all of the metadata is no longer needed, or at least will not be needed for an extended period of time. This type of shutdown event may not result in the master application 328 losing power like other shutdown type events.

If a shutdown event has not occurred, then the cache page 322 is maintained in a locked state and the master application 328 is allowed to access the metadata on the cache page 322 (step 428). On the other hand, if a shutdown type event does occur, then the master application 328 instructs the locking function 332 to unlock the cache page 322 (step 448). When the cache page 322 is unlocked, the master application 328 has released control over the cache page 322. Only after the cache page 322 has been unlocked can the cache application 338 resume complete control over the cache page 322. Therefore, after the cache page 322 has been unlocked, the cache application 338 writes the cache page 322 back to the storage device 204 (step 452). This results in the updated metadata finally being written back to the storage device 204. The metadata could have been updated a number of times before it is written back to the storage device 204. This is because the master application 328 assumes and maintains control over the cache page 322. This differs from the prior art where the cache application 338 controls the cache page 322 and therefore writes changes to the storage device 204 after every commit operation or change to the metadata.

In accordance with embodiments of the present invention, the cache application 338 does not write the contents of the cache page 322 back to the storage device 204 until the master application 328 has unlocked the cache page 322. This helps prevent discrepancies between mirrored metadata and metadata stored on the storage device 204 because the master application 328 retains control of the cache page 322.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A computer-implemented method of accessing metadata from a storage device, comprising:
   requesting metadata by a first application;
   retrieving, by a cache application, the requested metadata from a storage device;
   writing the metadata from the storage device to an allocated cache page;
   assuming control, by the first application, of the cache page with the metadata written thereon;
   locking, by the first application, the cache page, wherein locking comprises restricting the cache application from controlling the cache page and writing contents of the cache page to the storage device while allowing a second application to access metadata on the cache page; and
   accessing, by the first application, the metadata from the locked cache page.

2. The method of claim 1, further comprising:
   updating, by the first application, the metadata;
   writing, by the first application, the updated metadata to the locked cache page; and mirroring the locked cache page with the updated metadata to a remote system.

3. The method of claim 2, further comprising executing, by the first application, a second command during at least one of the writing and mirroring step, wherein the second command includes accessing the metadata from the locked cache page.

4. The method of claim 2, wherein the remote system comprises a second controller and wherein the mirroring step comprises copying the updated metadata from a first controller associated with the first application to a portion of memory on the second controller.

5. The method of claim 1, further comprising:
   waiting for a shutdown event to occur;
   in response to the shutdown event occurring, unlocking, by the first application, the cache page; and
   writing, by the cache application, the metadata on the cache page back to the storage device.

6. The method of claim 5, wherein the cache page is not unlocked and the metadata on the cache page is not written back to the storage device unless the shutdown event occurs.

7. The method of claim 1, wherein the metadata comprises backing store metadata and wherein the second application is the cache application.

8. A device for controlling a storage system, comprising:
   memory comprising:
   a cache memory comprising a cache page;
   a cache application for controlling the cache memory; and
   a first application, wherein the first application requests that the cache application allocate the cache page from the cache memory to store metadata, the first application comprising:
   a locking function, wherein the locking function locks the cache page after the metadata has been written to the cache page, wherein the cache page is accessible by a second application while the cache page is locked by the locking function and wherein the cache page cannot be written back to a storage device by the cache application while the cache page is locked by the locking function; and
   a metadata reader/writer adapted to access the metadata while the cache page is locked by the locking function; and
   a processor subsystem, wherein the processor subsystem executes the cache application and first application.

9. The device of claim 8, wherein the locking function maintains the cache page in a locked state until the occurrence of a shutdown event, wherein the second application is the cache application.

10. The device of claim 9, wherein the shutdown event comprises an event that causes the power supplied to the cache memory to be interrupted.

11. The device of claim 9, wherein the locking function unlocks the cache page upon detection of the shutdown event thereby allowing the cache application to write the metadata on the cache page back to the storage device.

12. The device of claim 8, wherein the metadata reader/writer changes the metadata and commits the changes to the cache page as a part of accessing the metadata.

13. The device of claim 12, wherein the metadata reader/writer executes a second command requiring access to the metadata while the changes to the cache page are being committed.

14. The device of claim 12, wherein the metadata reader/writer mirrors the changes to the cache page to a remote system in the course of committing the changes to the cache page.

15. The device of claim 8, wherein the cache page is maintained in a locked state on at least one of a battery backed volatile memory and capacitor backed volatile memory.

16. An electronic data system, comprising:
   memory including:
   first means for controlling comprising:
   means for reading metadata from a storage device, wherein the metadata comprises pointers to snapshot data stored on the storage device;
   means for storing the metadata on a cache page;
   means for locking the cache page such that the means for storing the metadata on the cache page is restricted from writing contents of the cache page back to the storage device while the cache page is locked but is allowed to access contents of the cache page while the cache page is locked;
   means for accessing the locked cache page; and
   means for updating the metadata in the locked cache page, wherein the means for accessing commits changes to the locked cache page and mirrors changes to a second controlling means while simultaneously accessing the locked cache page; and
   a processor subsystem adapted for executing the contents of the memory.

17. The system of claim 16, wherein the metadata is read from the storage device in a first state and changed to a second state by the means for updating, wherein the first state and the second state are different.

18. The system of claim 17, wherein the metadata in the second state is accessed by the means for accessing prior to being written back to the storage device.

19. The system of claim 17, wherein the metadata is further updated to a third state by the means for updating prior to being written back to the storage device.

* * * * *